(No Model.)
T. DUNCAN.
ELECTRIC METER.
No. 550,823.   Patented Dec. 3, 1895.
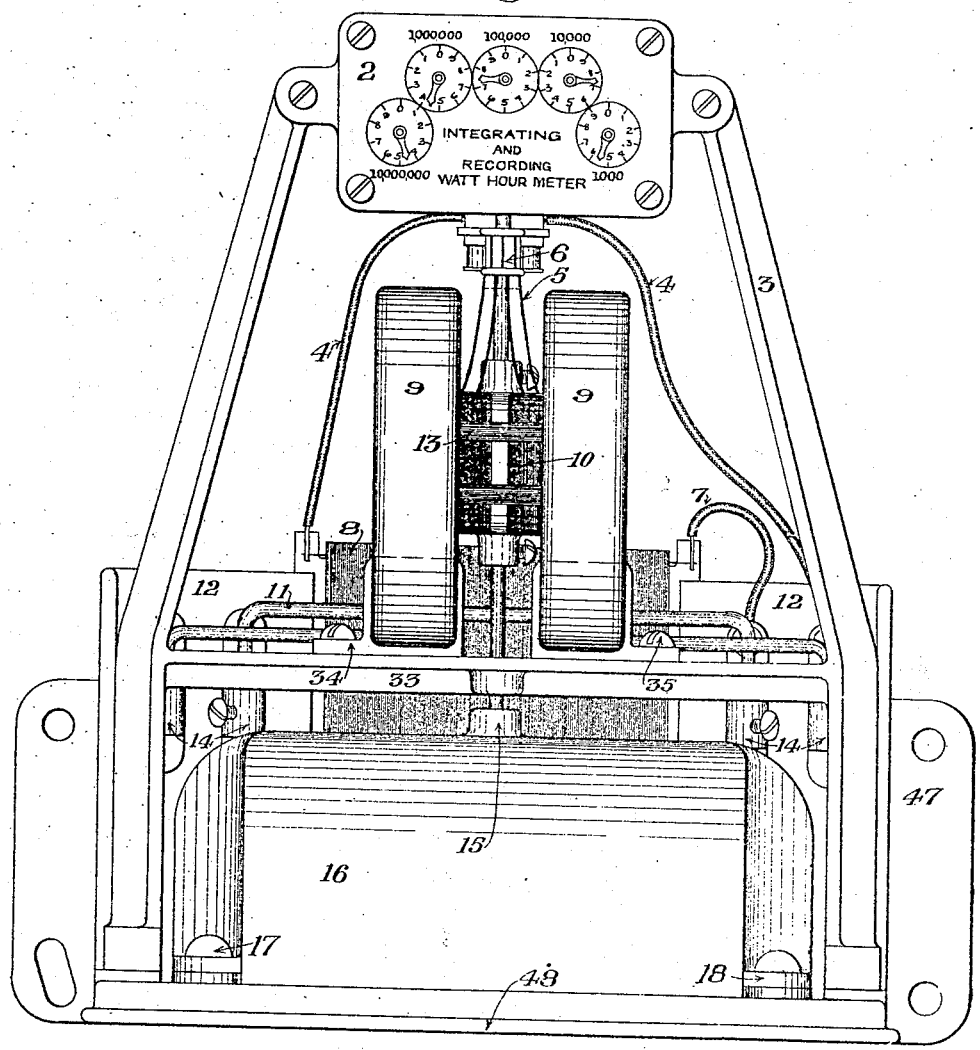

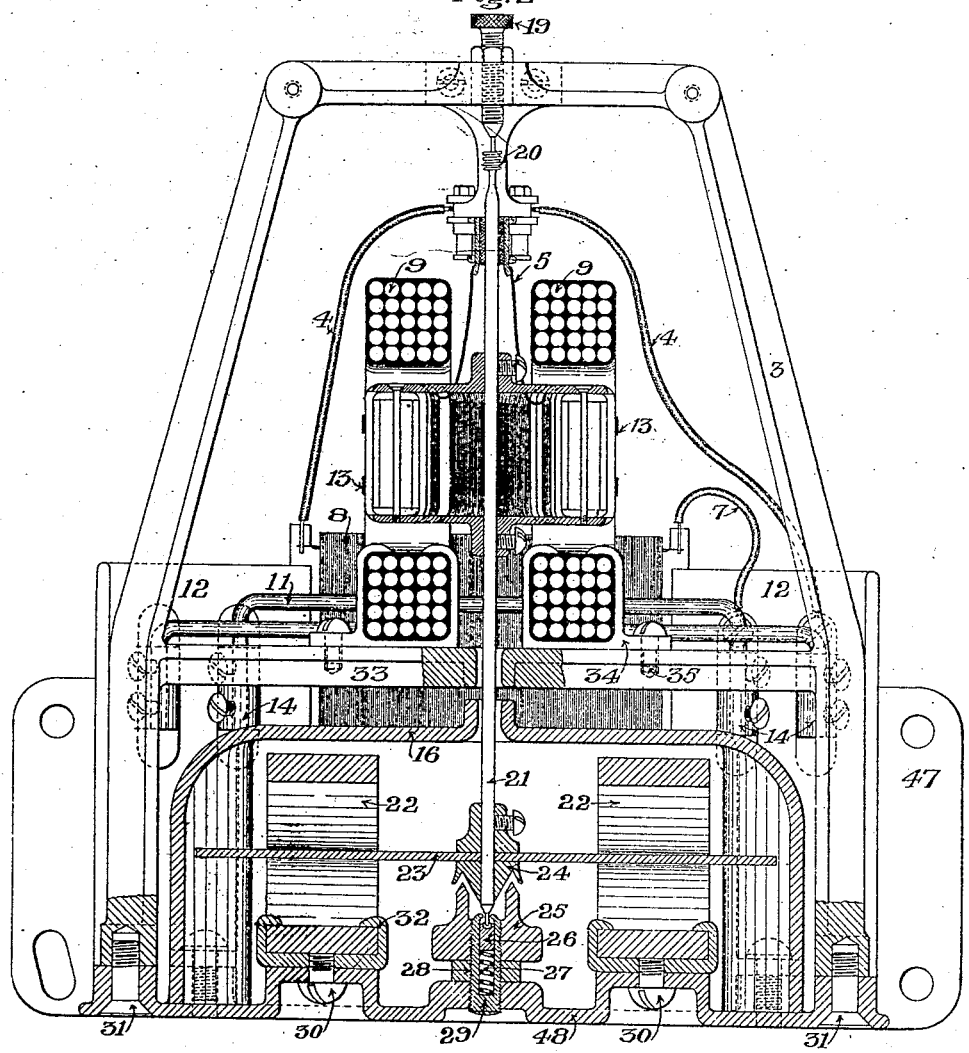

(No Model.)
T. DUNCAN.
ELECTRIC METER.
No. 550,823.                    Patented Dec. 3, 1895.
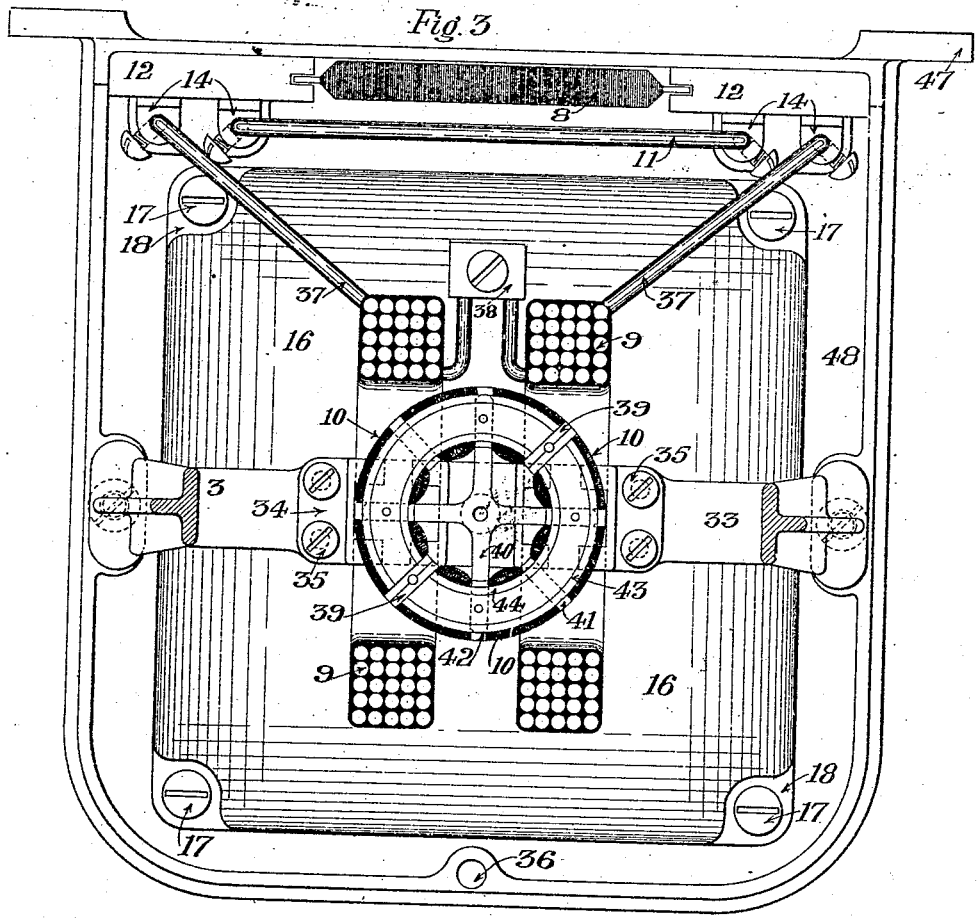
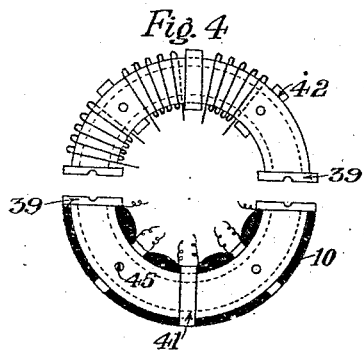
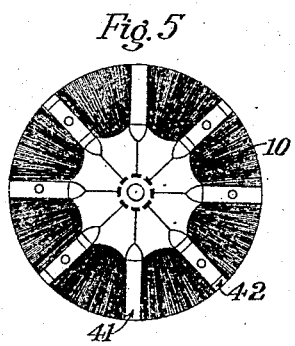
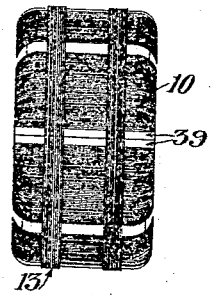
Witnesses
John J. Muir
F. H. Lambert
Thomas Duncan Inventor
By his Attorneys Chapin & Denny (No Model.) 7 Sheets—Sheet 4.
T. DUNCAN.
ELECTRIC METER.
No. 550,823. Patented Dec. 3, 1895.
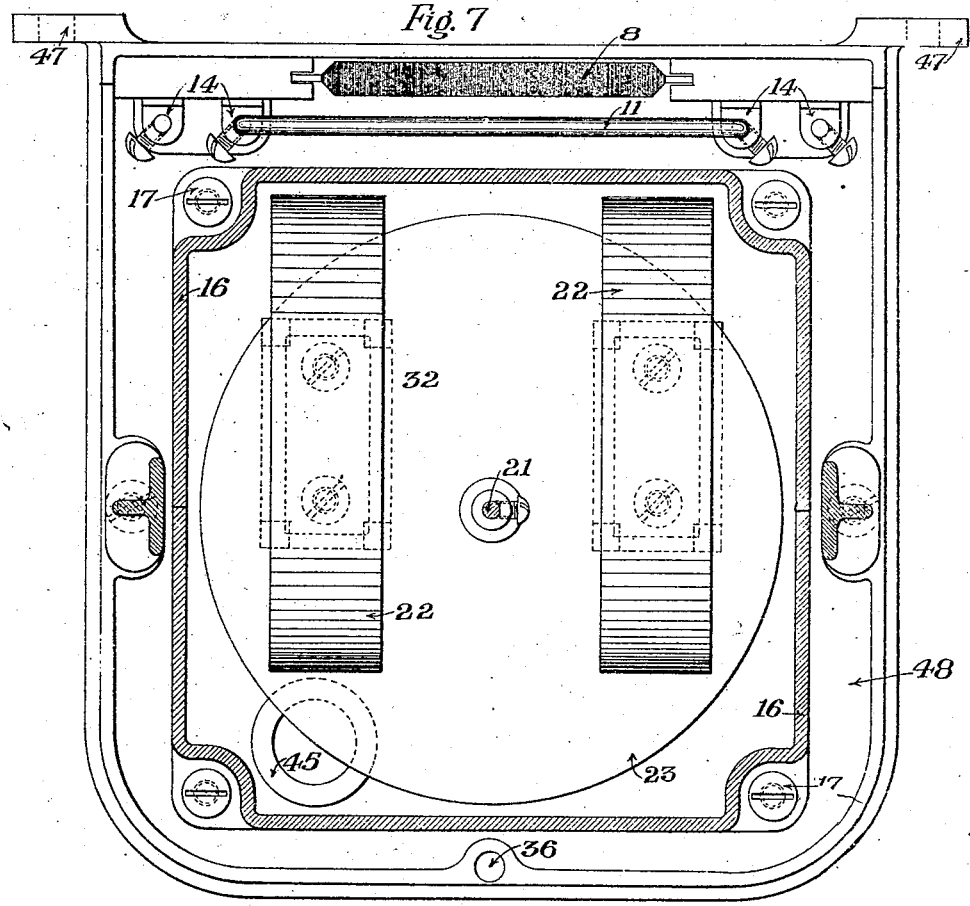
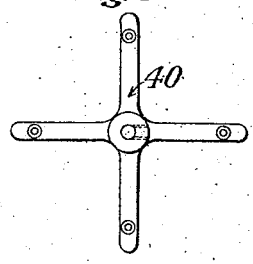
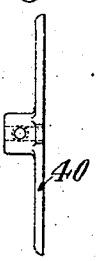
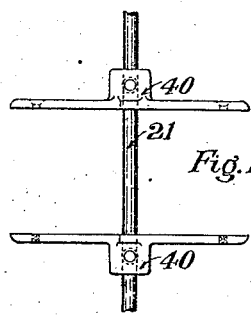
Witnesses
John J. Muir
F. H. Lambert
Thomas Duncan Inventor
By his Attorneys Chapin & Denny (No Model.) 7 Sheets—Sheet 5.

T. DUNCAN.
ELECTRIC METER.

No. 550,823. Patented Dec. 3, 1895.

Witnesses
John J. Muir
F. H. Lambert

Thomas Duncan Inventor
By his Attorneys Chapin & Denny (No Model.) 7 Sheets—Sheet 6.
T. DUNCAN.
ELECTRIC METER.
No. 550,823. Patented Dec. 3, 1895.
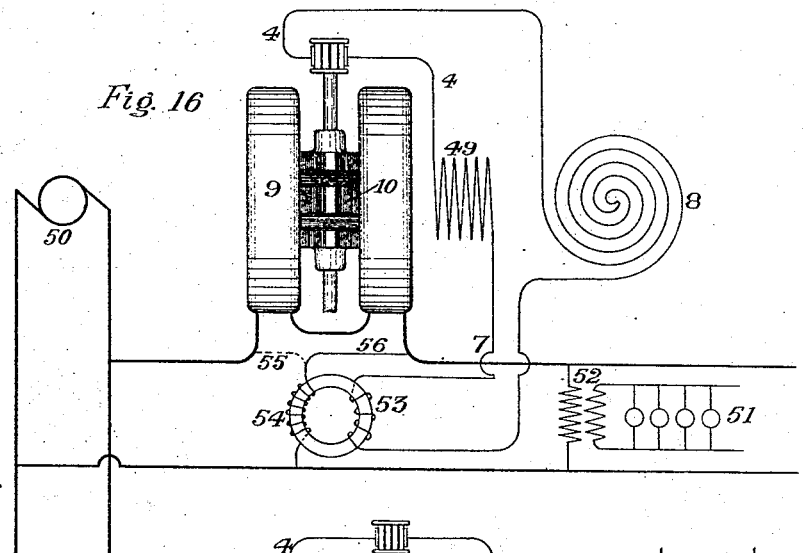
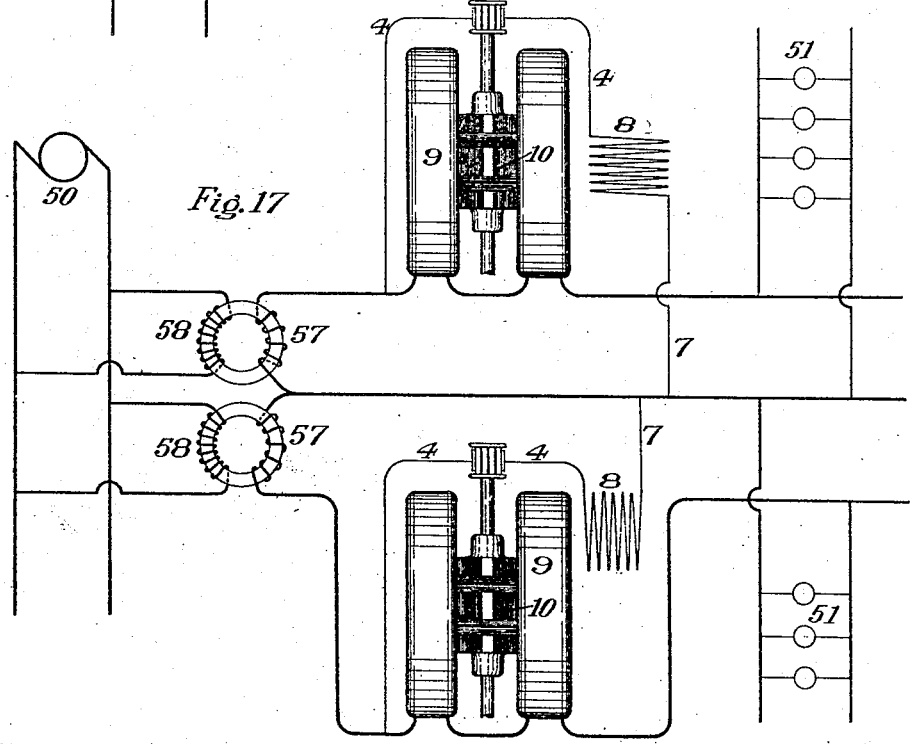
Witnesses
Thomas Duncan Inventor
By his Attorneys Chapin & Denny

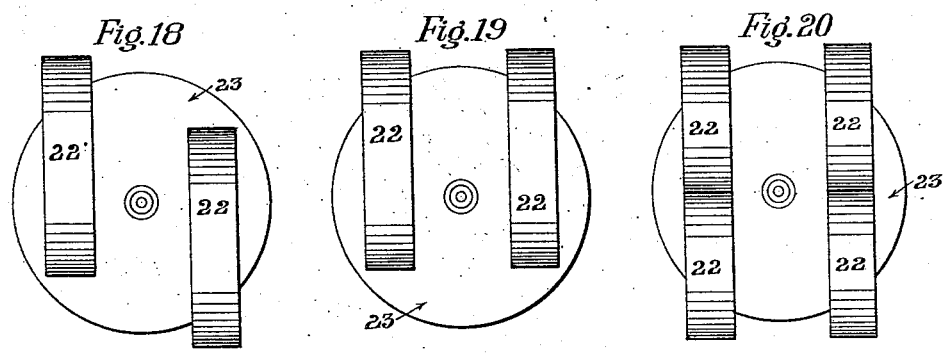

UNITED STATES PATENT OFFICE.

THOMAS DUNCAN, OF FORT WAYNE, INDIANA.

ELECTRIC METER.

SPECIFICATION forming part of Letters Patent No. 550,823, dated December 3, 1895.

Application filed May 22, 1895. Serial No. 550,165. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electricity-Meters; and I do hereby declare that the following is a full, clear, and exact description of the invention, which will enable others skilled in the art to which it appertains to make and use the same, reference being had to the accompanying drawings, which form part of this specification.

My invention relates to that class of meters known as "integrating and recording energy or watt-hour meters," having a commutator for rectifying the armature-current and exerting a torque proportional to the energy passing through it, and has for its object the following improvements: first, an armature so designed that it is easy to construct, assemble, inspect, and repair; second, a commutator and brushes that do not tarnish or become black by exposure to the air, but remain bright and in a perfect condition; third, a proportioning of the winding and form of the field-coils and armature, so as to cause the meter to give an absolutely-correct record of the energy passing through it, making no difference whether it reads on direct or alternating current circuits; fourth, the method of preventing deterioration in strength of the magnets employed to produce the necessary brake force by shielding them from the influence of the field-coils of the meter; fifth, the further elimination of the weakening of the drag-magnets by setting them at right angles to the axis of the field-coils.

The foregoing are among the new and novel improvements constituting my invention and will be more fully described hereinafter in detail.

In the accompanying drawings, Figure 1 is a front elevation of the meter complete. Fig. 2 is a front elevation in section, showing the position of the drag-magnets and the shielding-cup, also the construction of the field-coils and armature. Fig. 3 is a plan of the motive part of the apparatus, the shielding-cover 16, and the outline of the base 48. Fig. 4 shows the construction of the armature, in which the upper half is for showing the mode of winding and the lower a section of the finished winding. Fig. 5 serves to give an idea of the complete winding of the armature with its necessary commutator connections, while Fig. 6 shows a side view of same with the band or tie thread in place to keep the armature together. Fig. 7 is a plan view, in section, of the drag or brake part of the meter, showing the relative positions of the magnets and disk. Figs. 8, 9, 10, and 11 represent the several views of the armature-spiders and their location upon the spindle or shaft. In Figs. 12, 13, 14, 15, 16, and 17 are shown the various ways of connecting the meter into direct and alternating current circuits of distribution. Figs. 18, 19, 20, and 21 are plan views of the retarding part of the meter, showing the different ways of placing or using the magnets and disk. Figs. 22, 23, and 28 are elevation views of the magnets, said Figs. 22 and 23 also showing the location of the disk between their poles. In Figs. 24, 25, 26, 27, 29, 30, 31, 32, 33, 34, 35, 36, and 37 are shown the various parts constituting the construction of the armature-cover.

In the foregoing figures similar numbers refer to similar parts, and in which 9 is the series or field-coils connected by 37 in the work-circuit, as shown in Fig. 3.

The coils may be connected either in series or multiple, depending upon the desired carrying capacity. In Figs. 1, 2, and 3 they are shown in series, having their inner terminals joined together by a clamp 38, Fig. 3, while their outer terminals are rigidly connected by 37 to the outside binding-posts 14, which connect them with the circuit-wires. In winding these field-coils I have experimentally demonstrated that when wound so that their cross-section is square in form—that is, having sides equal in length, as shown in Figs. 2 and 3—the results obtained are greatly in advance of any yet obtained by any other form. By such a construction the resistance of the magnetic circuit is reduced to the very lowest possible amount, thereby insuring a greater density of flux than otherwise could be obtained with a given number of turns and current. I further find that this form of construction is ideal when the entire field envelops the armature, so that their ends are flush or of the same width, as shown in the plan view, Fig. 3, where 10 is the armature. In these drawings the space between the field-coils 9 is shown to be of a width about equal to that of one of the coils; but better results are obtained by making this space smaller and maintaining the form specified when the construction of the meter permits. For instance, in a meter not provided with a commutator this space may be made much smaller, or just large enough to allow the shaft to rotate. Besides reducing the magnetic resistance it also reduces the $C^2R$ loss by being able to do the same amount of work with less turns and length of wire in the coils. Another feature of this form of coil is that it produces a better starting torque, thereby doing away entirely with a special coil on small meters inserted in shunt across the mains and acting in conjunction with the series coil to give the necessary starting torque to overcome the friction of the bearings of the meter. The coils are connected in series in the main source of supply and produce a field whose strength varies with the current flowing. They surround or envelop the armature 10, which also possesses many novel features of construction. The armature being connected in shunt to the mains in series with a resistance gives a field proportional to the electromotive force at its terminals. Hence the torque is equal to the product of the two forces or fields acting upon each other.

In order that the rate of rotation may be in exact ratio to the energy passing through the meter, the torque resulting from the forces set up by the series or current field and the shunt or volt field must be opposed in some manner, otherwise the resulting speed would be an accelerating one. This opposition offered to the rotation of the motor must also be governed by a force which varies in the same manner as does the torque of the motor itself, as follows:

Since the turning movement of the motor varies as the energy, the opposition or drag must also vary as the energy or torque, which is secured by a Foucault-current drag, consisting of a metallic disk rotated between the poles of one or more magnets.

In constructing the armature I employ a hollow ring or cylinder, as shown in Fig. 29, which consists of two rings of wood or other suitable material and of different diameters, Figs. 24 and 26, and in section in Figs. 25 and 27, held together at the top and bottom by another flat ring 45 in Fig. 30. A section of this hollow cylinder is given in Fig. 31. To facilitate winding I saw the cylinder through the center in the direction of and with the axis, as shown in Fig. 4. By so doing the small armature-coil can be wound upon a separate former and then slipped on the hollow core in the manner shown in Fig. 4, separating them with the small rectangular-shaped collars 41, Fig. 34. I have also put these collars in position by gluing them to the hollow core and winding by hand the coils into position. Where the ends butt together, I employ the flat pieces 39, Fig. 32, which are provided with a semicircular groove, through which fits and passes the screw 46, Fig. 10. This screw is for fastening the top and bottom spiders 40 together, as shown in section in Fig. 2. The top and bottom parts of the collars 42, upon which these spiders rest are, cut away, so as to prevent the spider-arm from being too high, making it normally even or flush with the top of the armature-coils, as shown. These collars 42 are represented in two views by Figs. 36 and 37, respectively. When these two halves are brought together and the spiders put into position and screwed fast, the whole is bound around the outside with thread to keep it in a rigid state, as shown by the two windings or bands 13 in Fig. 6. This makes it very easy to take apart in case of repair, something to be appreciated by all users of commutated motor-meters. The armature is then mounted on a spindle 21, which also carries the aluminum disk 23, the locking-hub 24, and the worm 20, which meshes into a suitable worm-wheel and drives the registering-train 2, which reads in watt or horse-power hours. This spindle also carries a commutator of aluminum 6, which forms another of the elements of my invention.

For years the users of meters having commutators have been given an endless amount of trouble in various ways. It was thought that silver was the only metal that could be employed to make commutators, and in fact was the only one that was productive of a fair degree of success. However, I have experimentally demonstrated that aluminum is very superior to silver for this purpose in many ways. The drawback attending a commutator made from silver is in its becoming tarnished and black. This I find to be more marked and troublesome when the meters are used in localities where natural gas is employed, due, no doubt, to the presence of sulphur in greater or less quantities. In fact, I have never seen a meter in service with a silver commutator for a period of more than two months until it would be badly tarnished and in many cases quite black. When a commutator of aluminum is employed, this tarnishing and troublesome effect is wholly eliminated.

I have also employed aluminum alloyed with another metal or metals, making it easier to work by making it harder, with equally good results.

For connecting the armature-terminals to the commutator I plate with copper the lower extremities of the commutator, thereby permitting their being easily soldered to the wires 5.

The current traversing the commutator is small, there being a large resistance 8 in series with it, which is wound upon a card and slipped down between the two insulating-blocks 12 in slots provided for that purpose, and shown in the plan view, Fig. 3. The small wires 4, 4 and 7 complete the shunt connections through the armature 10, commutator 6, and resistance 8.

The inner terminals of the meter are connected together with a wire 11 in order to complete the circuit. The series coils are held upon the cross plate or bar 33, which is cast in one piece with the arched support 3. The clamps 34, holding said coils, are held in position by the screws 35. The spindle 21 is held vertically between the upper bearing 19 and the lower jeweled bearing 26. This lower bearing, as seen, consists of a threaded post 29, having a portion of its center drilled out to admit the spring 27, on top of which rests the jewel and its setting 26. This construction allows the meter to be used or handled without the constant dread of breaking the jewel, as the spiral spring takes up any sudden or dangerous jar, thereby protecting it from being broken or damaged by the shaft-point. When this post or bearing 29 is adjusted to the proper height, it is secured by a jam-nut 28. If it is desired at any time to handle or remove the meter, or in cases of transportation it is necessary that the spindle-point be raised up out of the jeweled bearing, this can be done very effectively by raising the thumb-nut 25, which is provided on top with a pointed extension that fits into the circular grooves upon the lower side of the hub 24.

Figs. 1, 2, and 3 show the several views of my improved method of protecting the drag-magnets 22 from becoming weak by being subjected to external magnetism. This is particularly noticeable when the meter is employed to measure the energy on alternating-current circuits by reason of the lines of alternating magnetism emanating from the field-coils, tending to demagnetize them by the sudden reversals which they are subjected to when placed within an alternating field. I have also known of cases where the magnets were weakened upon direct-current circuit in two ways: first, by being always in a position where their polarity was opposed by the field produced by the series coils, and, second, by suddenly changing the intensity of the magnetic flux of the field-coils—such, for instance, as when all the lights would be turned on or off at one time, or by accidentally opening the circuit, or when a fuse would blow. This can very easily be accounted for by assuming that the time the field-coils are traversed by a current the lines of magnetism stand out from the axis of the coils, completing their circuit in the same manner as those emanating from a permanent magnet; but as soon as the current in the series coils is altered there is also a corresponding change in the intensity of magnetism, which naturally has a detrimental influence upon the strength of the magnets, being much more marked if the circuit be accidentally opened or closed when loaded. Therefore, with the object of preventing this change in the strength of the magnets, I have employed the method herein shown, which consists of the iron or steel hood 16, covering the magnets and disk. This takes up any and all of the stray lines of magnetism and conducts them from side to side, which would otherwise be taken up by the magnets themselves. Another advantage of this form of hood is that it renders that part of the meter absolutely dust-proof and prevents the entrance of insects. This hood consists of two castings 16 and a boss 15, which fit together along the line or surface shown by the sectional view in Fig. 2 and are screwed into position upon the base by the four screws 17, one being at each corner 18. When the meter is placed in position and ready to start, the front half of this hood is removed for the purpose of lowering the check or supporting nut 25, in order to let the spindle down upon the jeweled bearing 26, when it may be replaced again in a few seconds. If found necessary, a rubber or felt gasket may be employed around the lower edge or central facing to prevent dust from entering. As a means of adjusting the speed, the magnets are employed in the usual manner by being adjustable upon the base 48 by the set-screws 30, which hold them in position. This means of adjusting, however, is only used after the necessary speed has approximately been obtained by changing the amount of resistance in series with the armature, as it admits of being able to adjust the rate of rotation to the very minutest degree of accuracy.

My invention further consists in the position of the magnets, as related to the energizing field-coils of the meter, by having their magnetic flux operating at right angles to each other. When the drag-magnets are placed in this position, I have found that the effect of the series coils upon them is eliminated, thereby showing that when the lines of force from the field-coils pass or cut the magnets at right angles to the direction of their flux that little or no reversal takes place. The magnets may be placed in proximity to the revoluble disk in any of the several ways shown in Figs. 18, 19, 20, 21, 22, and 23, the latter showing the polarity of these magnets to be the same upon the same side of the disk for preventing their fields from short-circuiting.

I also claim the form of magnets herein shown, which I find to be very easily made and magnetized, besides being least affected by external fields. Its poles are located at a point farthest removed from its neutral line or yoke, thereby insuring freedom from leakage. With this combination of improvements in the retarding mechanism, the meter may be used in places where external fields of magnetism are present without fear of being influenced by them and made to give erroneous indications or records.

I do not wish to be understood as limiting myself solely to the use of the inverted cup or bowl of iron shown in these drawings, but claim the use of any form applied for the purpose herein set forth. I have successfully used a disk or sheet of iron or steel placed at a convenient point between the field-coils and the drag-magnets; also, a bar or strip of convenient width and thickness to take up these field-coil lines of magnetism and prevent their passing through said magnets.

Various other forms and methods of applying this magnetic shield will readily suggest themselves to those skilled in the art.

The meter containing the herein-described improvement I find to fully satisfy the present requirements and demands of central-station men and consumers in general in having the following points of merit:

First. It follows an absolutely straight line law by having the form or shape of the field-coils as herein described and of such dimensions and relations to the diameter of the armature that a correct record upon any load from unity to maximum is obtained.

Second. It is provided with a commutator and brushes that do not become tarnished and black a few weeks after they are installed and do not cost as much as silver, from which nearly all commutators upon the market at the present time are made. The commutator and brushes are also capable of being used in the presence of gases that would prove detrimental in a very short space of time to others made of silver. Further, they do not show the effects of sparking as readily as when silver or any of the other non-oxidizing metals are used.

Third. Its armature is light, durable, easily made, assembled, and particularly easy to inspect and repair.

Fourth. The retarding device employed is free from the influence of external fields of magnetism, thereby insuring accuracy of registration by the permanent magnets being protected, so that they will retain their magnetism longer than any others now found in use.

Fifth. It may be employed upon direct or alternating current circuits with equal accuracy and without making any special calibration for either current.

In assembling the meter the cast arch 3 is secured to the base 48 with the screws 31. The said base is provided with the lugs 47 for fastening it to its support, also a hole 36 for locking the cover.

In screwing the magnets upon the bosses provided for them they are first set into the clamps 32, which are held in position upon said bosses by the screw 30. The clamps, however, could be dispensed with by having the screws enter the bottom limb of the magnet itself; but it is found somewhat difficult to properly harden or temper tungsten-steel magnets with holes in them without cracking them.

Fig. 12 is the diagram of a meter without any auxiliary field-winding, such as small meters whose speed is high enough upon minimum load, and does not require any extra torque. Fig. 13 shows in series with the armature small coils 49, used in conjunction with each of the series coils 9, for the purpose of helping to start large meters upon small loads. The work-circuits in these views are represented by number 51, while number 50 is the generator.

Fig. 14 shows the shunt-winding 49, wound directly upon the outside of the series coil 9, while Fig. 15 shows only one shunt-coil 49, placed within the said series coil 9. This further shows the method of connecting the meter into a three-wire system of distribution.

Fig. 16 shows the manner in which the necessary connections are made for measuring the total energy or output from a central station, in which is employed a transformer consisting of a primary coil 54 and secondary 53. The secondary terminals of the transformer are connected to the armature 10 through the resistance 8 and shunt-coil 49. The total energy in this arrangement will be equal to the resulting speed or indications multiplied by the ratio of transformation between the primary and the secondary feeding the armature. The transformer 52 is connected to the primary mains and represents the load or energy being consumed and passing through the meter. The line 56 is connected beyond the series coil of the meters in order that the current required to magnetize the iron core of the transformer will pass through them, thereby producing an initial field or torque to help overcome the friction of the meter. If this method be applied to large buildings, (where it would require too large an outlay to provide all the circuits with a meter each,) by simply inserting a meter in the primary which feeds all the transformers, the wire 56 would have to be connected to the other side of the field-coils, as shown by the dotted line 55, since the magnetizing-current of the several transformers might be enough to cause the meter to run when no lamps were in use upon the secondaries. This motion would be all right in the first case—viz., that of measuring the total output of a central station—but in the latter case the energy consumed as magnetizing-current in the tranformers must be borne by the producers or central-station company themselves. Hence the meter in this case must move only at times when there are lamps in use.

Fig. 17 shows two meters connected into the two sides or circuits of a three-wire-transformer system.

Fig. 28 shows the form of magnet used in Figs. 18, 19, 20, and 21.

Fig. 29 shows the hollow cylinder before it is cut or sawed through, as shown in section in Fig. 31.

What I claim is—

Figure 12:
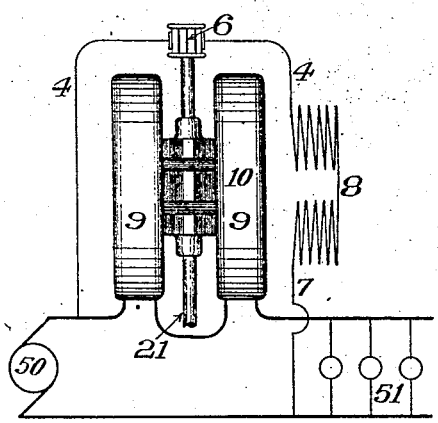
Figure 13:
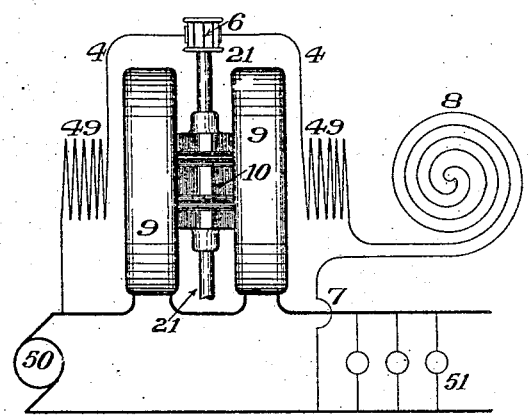
Figure 14:
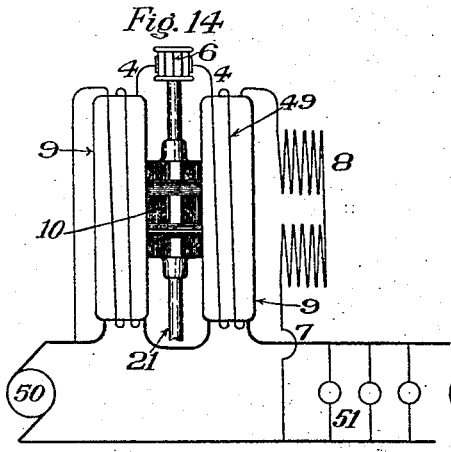
Figure 15:
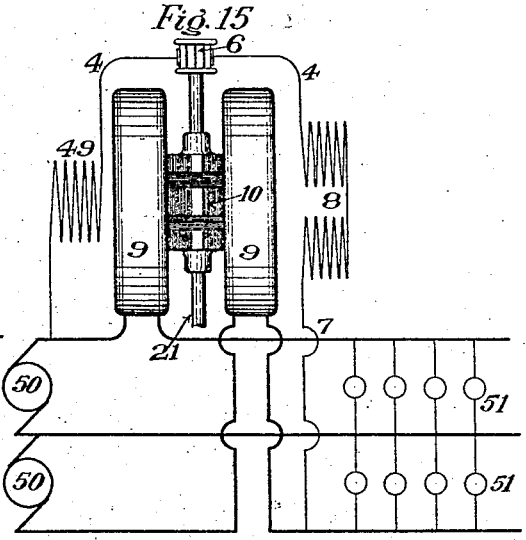

1. In an electric meter, a magnetic medium or shield interposed between the drag or damping magnets and the field coils or other external fields or source of magnetism, adapted to receive the stray lines of magnetism from the said field coils or other external source, and thereby protect the said magnets from the effects of external magnetism, as and for the purpose described.

2. The combination in an electric meter, of a field coil or coils whose sides are rectangular in cross section with sides of equal length, for the purpose specified, an armature of suitable construction and revoluble within the magnetic field established by said coils, and whose diameter is equal to the axial length of the said field coils, a commutator of aluminum, an integrating mechanism, a retarding device, and vertical spindle carrying the said armature, commutator, and moving elements of the retarding device, all substantially as described.

3. In an electric meter, the combination of the vertical, externally threaded post 29 removably mounted by a screw threaded connection upon a suitable base or support for the purpose specified, the spiral spring 27 loosely mounted in said post as described, and the metallic piece 26 arranged in said post, as shown, to support the jewel, all substantially as described.

4. The combination in an electric meter, of a retarding mechanism consisting of an aluminum disk, traversing the field or fields produced by one or more permanent magnets having their like poles upon the same side of said disk, and a magnetic shield as and for the purpose herein set forth.

5. The combination in an electric energy meter, of a retarding mechanism, consisting of a metallic disk mounted upon a spindle and revoluble therewith, a multiplicity of magnets whose fields are traveled by said disk, and a hood or other suitable form of magnetic material for shielding the drag magnets from external magnetic fields, said hood being secured at suitable points upon the base of the meter as set forth.

6. The combination in an electricity meter of a work or retarding mechanism, consisting of a closed circuit, or conductor moving in close proximity to one or more permanent magnets which develop or generate Foucault or eddy current in said closed conductor, and a shield of magnetic metal interposed between said retarding mechanism and the external source of magnetism to be guarded against, said shield being divided into two parts to facilitate construction and having a raised portion or boss at its center through which the spindle passes as and for the purpose set forth.

7. The combination with the motive part of an electric meter, of an armature consisting of a hollow wooden or hard rubber ring or cylinder, upon which are placed the coils, said cylinder or ring being divided into two pieces and butting together in the manner shown as and for the purpose set forth.

8. In an electricity meter, the combination with a motor, and integrating or indicating mechanism, of a retarding device consisting of a movable aluminum or copper disk or cylinder, being cut in its motion by the magnetism of a plurality of magnets, having their field approaching a right angle to the axis of the external magnetic field, from which they are intended to be shielded, and an iron or other suitable protector of convenient form for shielding said magnets, as and for the purpose set forth.

Signed by me, at Fort Wayne, Allen county, State of Indiana, this 20th day of May, A. D. 1895.

THOMAS DUNCAN.

Witnesses:
HENRY C. KRAMER,
FLAVIUS J. YOUNG.

DISCLAIMER.

550,823.—*Thomas Duncan*, Fort Wayne, Indiana. ELECTRIC METERS. Patent dated December 3. 1895. Disclaimer filed December 13, 1906, by General Electric Company, assignee.

Enters its disclaimer—

"To that part of claim 1 in the specification of said Letters Patent that is in the following words, to wit: 'or other external fields or source of magnetism.'"—[*Official Gazette, December 18, 1906.*]

DISCLAIMER.

550,823.—*Thomas Duncan*, Fort Wayne, Indiana. ELECTRIC METERS. Patent dated December 3. 1895. Disclaimer filed December 13, 1906, by General Electric Company, assignee.

Enters its disclaimer—

"To that part of claim 1 in the specification of said Letters Patent that is in the following words, to wit: 'or other external fields or source of magnetism.'" [*Official Gazette, December 18, 1906.*]